United States Patent
Tsai et al.

(10) Patent No.: US 10,892,634 B2
(45) Date of Patent: Jan. 12, 2021

(54) POWER DISTRIBUTION UNIT WITH FEWER COMPONENTS AND SYSTEM

(71) Applicant: Shenzhen Fugui Precision Ind. Co., Ltd., Shenzhen (CN)

(72) Inventors: Yu-Chi Tsai, New Taipei (TW); Hsiao-Ping Hsueh, Taoyuan (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 0 days.

(21) Appl. No.: 16/526,474

(22) Filed: Jul. 30, 2019

(65) Prior Publication Data
US 2020/0393879 A1 Dec. 17, 2020

(30) Foreign Application Priority Data
Jun. 13, 2019 (CN) .......................... 2019 1 0512513

(51) Int. Cl.
*H02J 9/06* (2006.01)
*G06F 1/26* (2006.01)
*G06F 1/18* (2006.01)

(52) U.S. Cl.
CPC ................ *H02J 9/06* (2013.01); *G06F 1/189* (2013.01); *G06F 1/263* (2013.01)

(58) Field of Classification Search
CPC ............. H02J 9/06; G06F 1/189; G06F 1/263
See application file for complete search history.

(56) References Cited

U.S. PATENT DOCUMENTS

| 9,991,740 | B2 * | 6/2018 | Bailey | ................. H05K 7/1492 |
| 2012/0146410 | A1 | 6/2012 | Shih | |
| 2015/0076914 | A1 * | 3/2015 | Tsai | ......................... H02J 9/06 307/66 |
| 2017/0237285 | A1 * | 8/2017 | Wang | ...................... H02J 9/061 307/66 |
| 2019/0074714 | A1 * | 3/2019 | Huck | ...................... H02J 9/061 |

FOREIGN PATENT DOCUMENTS

| TW | 201225480 A | 6/2012 |
| TW | 201712995 A | 4/2017 |

* cited by examiner

*Primary Examiner* — Daniel J Cavallari
(74) *Attorney, Agent, or Firm* — ScienBiziP, P.C.

(57) ABSTRACT

A lower-cost power distribution apparatus (PDU) using a lesser number of components that connects with many power supply units. The PDU comprises first and second switching modules, for outputting AC from a first or a second power source. The first switching module and the second switching module automatically switch between opposite states (turned on or turned off) based on the AC power source. At a given instant, the first switching module and the second switching module are in opposite states.

8 Claims, 3 Drawing Sheets

POWER DISTRIBUTION UNIT WITH FEWER COMPONENTS AND SYSTEM

FIELD

The subject matter herein generally relates to power supplies.

BACKGROUND

A server cabinet includes a plurality of power distribution units (PDUs), a plurality of power supply units (PSUs), and a plurality of servers. Each PDU supplies power to the connected servers through one PSU through a connector. Each PDU is connected with a first power source and a second power source, and outputs alternating current (AC) to the connected PSUs. Each PSU is connected with the PDU through a slot, and converts the AC into direct current to output to the server. When the first power source and the second power source are 3-phase AC, each PSU includes six automatic transfer switching (ATS) elements. Each ATS element automatically selects one of the first power source and the second power source to output the AC. Due to the number of the ATS elements included in each PSU, the size of the PSU becomes bigger. Further, as the number of the PSUs increases, the number of the connectors also increases. The cost of server cabinets is thus too high, thus there is a room for improvement.

BRIEF DESCRIPTION OF THE FIGURES

Implementations of the present disclosure will be described, by way of example only, with reference to the figures.

DETAILED DESCRIPTION

Figure 1:
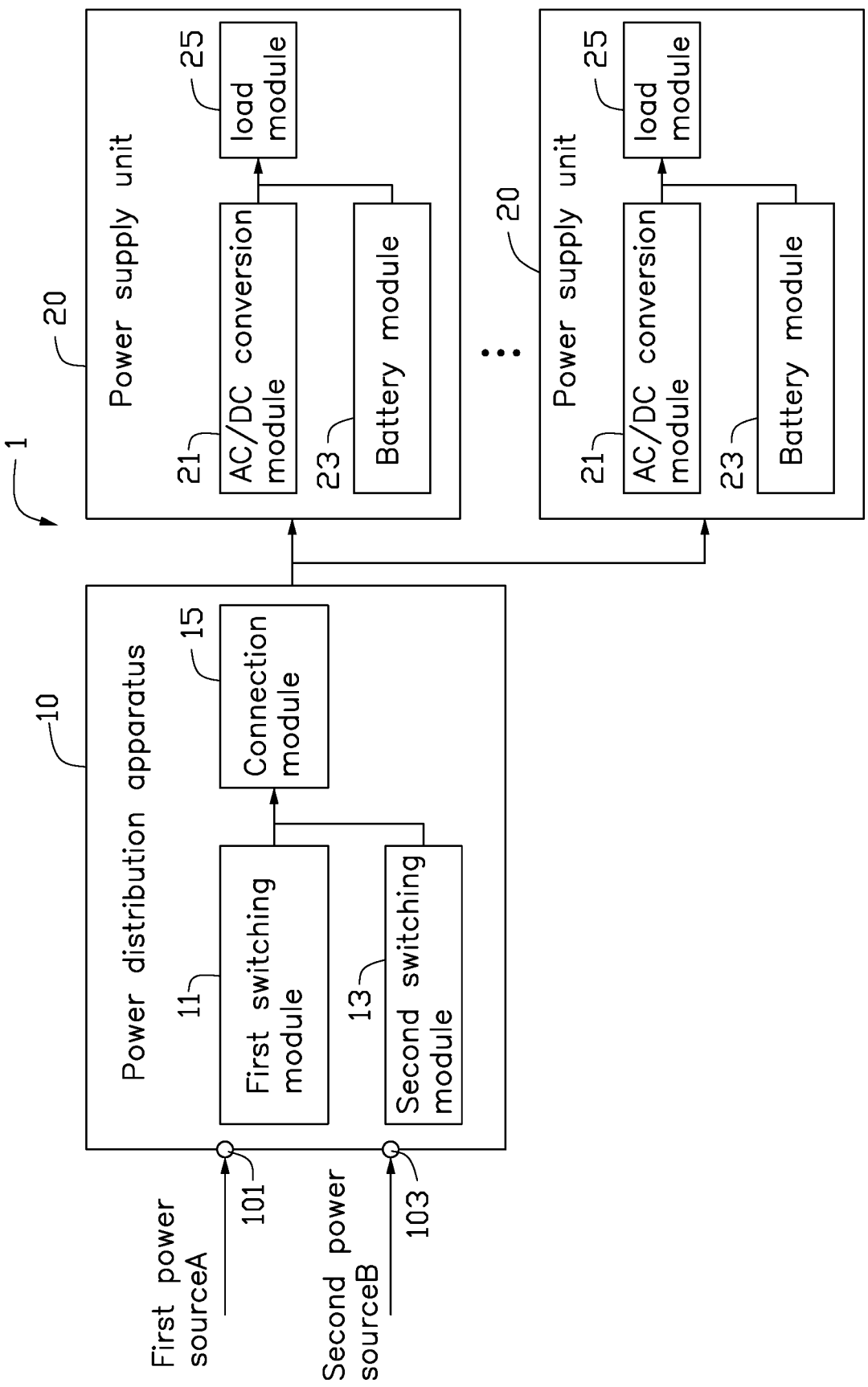
FIG. 1 is a diagram illustrating an embodiment of a server system, the server system includes a power distribution unit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure describes a server system with a lower cost.

Figure 2:
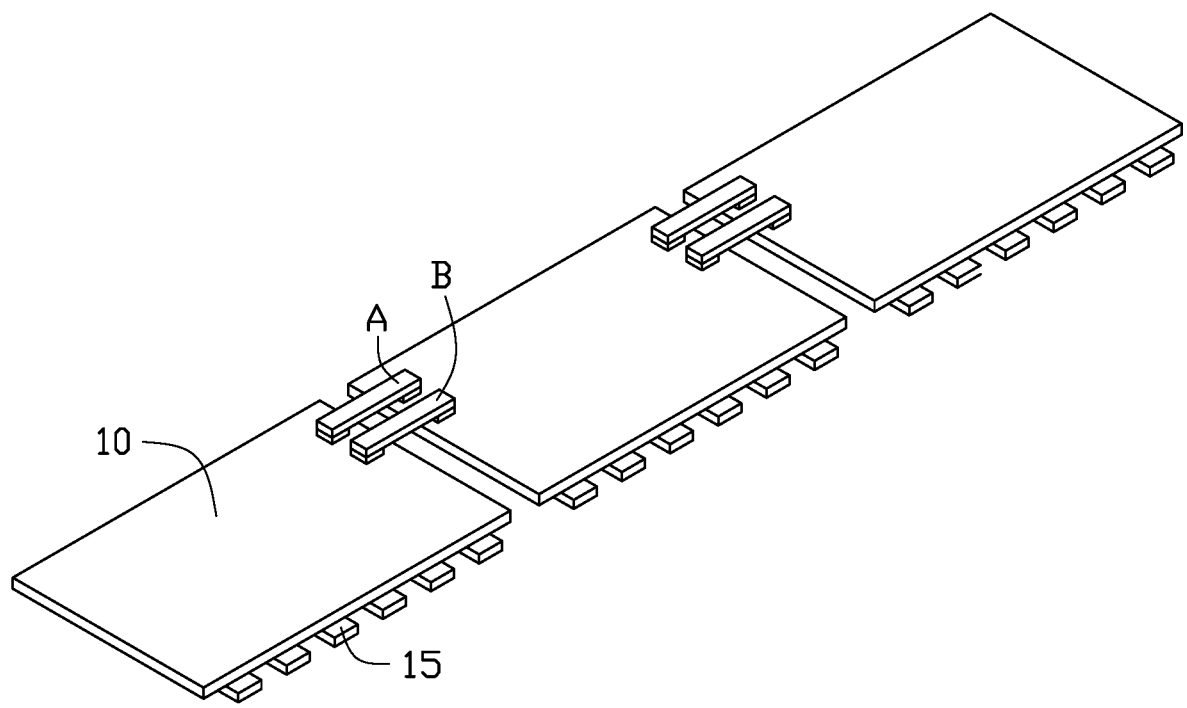
FIG. 2 is a diagram illustrating the power distribution unit of FIG. 1.

FIG. 1 shows an embodiment of a server system 1 with at least one power distribution unit (PDU 10), and FIG. 2 shows an embodiment of the PDU 10. The server system 1 includes a plurality of power supply units (PSUs 20). Each PDU 10 corresponds to multiple PSUs 20. A number of the PSUs 20 connected with one PDU 10 is relative to a load power of the PSU 20. In one embodiment, each PDU 10 is connected to six PSUs 20. In the embodiment, the server system 1 can further include a server frame (not shown).

The PDU 10 includes a first input terminal 101 and a second input terminal 103. The first input terminal 101 is configured to electrically connect with a first power source A, and the second input terminal 103 is configured to electrically connect with a second power source B. The PDU 10 outputs an alternating voltage (AC) from one of the first power source A and the second power source B to the connected PSUs 20. When the first input terminal 101 is electrically connected with first power source A and the second input terminal 103 is electrically connected with the second power source B, the PDU 10 outputs the AC from the first power source A to the connected PSUs 20. When the AC of the first power source A fluctuates, the PDU 10 outputs AC from the second power source B to the connected PSUs 20. In one embodiment, the first input terminal 101 and the second input terminal 103 receive a 3-phase AC. AC outputted by the PDU 10 is in a range from 10 to 20 amperes (10-20 A).

The PDU 10 includes a first switching module 11, a second switching module 13, and at least one connection module 15. The first switching module 11 is electrically connected between the first input terminal 101 and the connection module 15. The second switching module 13 is electrically connected between the second input terminal 103 and the connection module 15. Both the first switching module 11 and the second switching module 13 are capable of switching between a turn-on state and a turn-off state. At any point in time of the server system being powered, the first switching module 11 and the second switching module 13 are in opposite states. When the first switching module 11 is in the turn-on state, the second switching module 13 is in the turn-off state. When the first switching module 11 is in the turn-off state, the second switching module 13 is in the turn-on state. In one embodiment, the first switching module 11 and the second switching module 13 are automatic transfer switching (ATS) elements. In one embodiment, the PDU 10 includes six connection modules 13 (as shown in FIG. 3).

Figure 3:
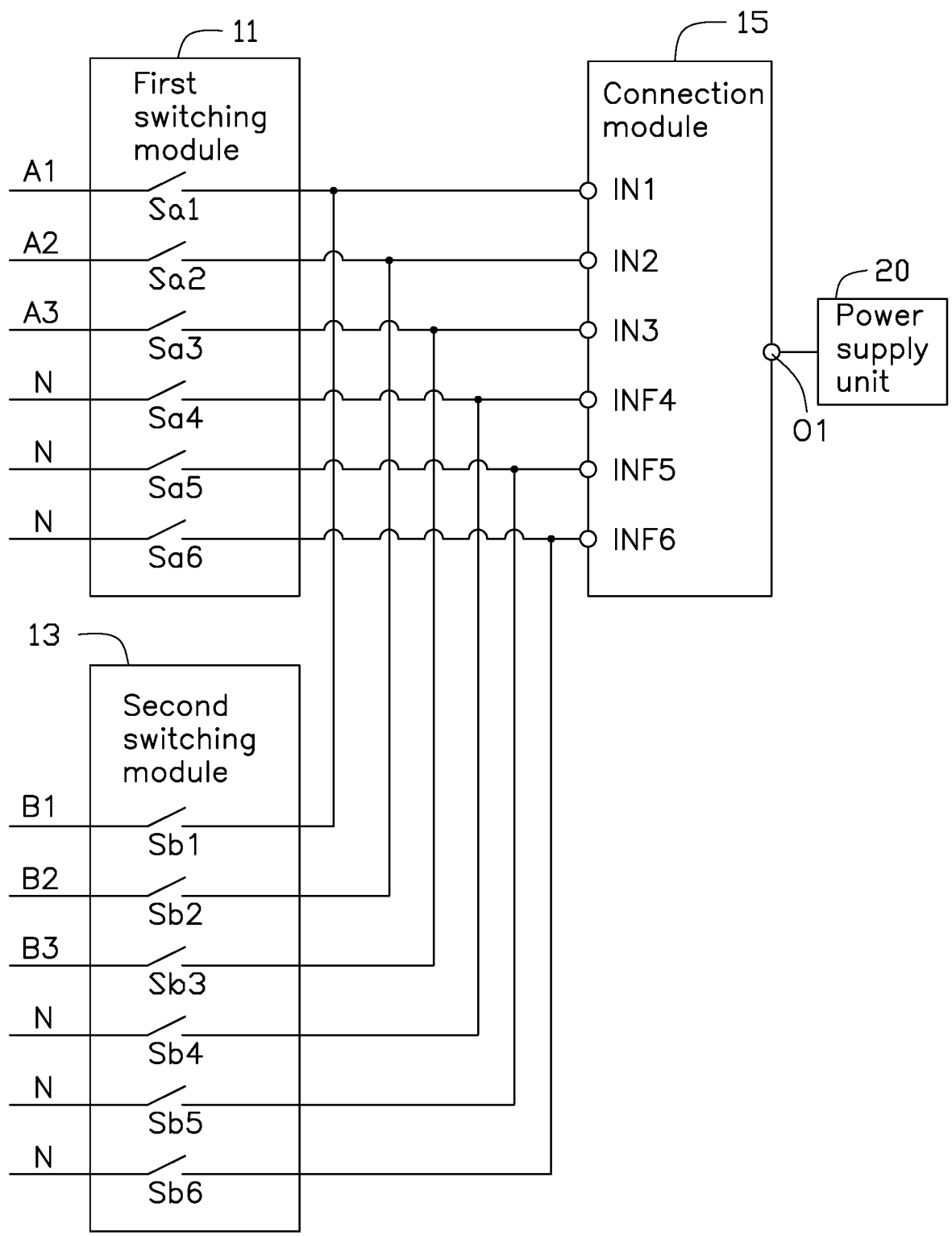
FIG. 3 is a block diagram illustrating the power distribution unit of FIG. 1.

FIG. 3 shows a block diagram of the PDU 10. When the first switching module 11 is in the turn-on state, the first switching module 11 establishes a connection between the first input terminal 101 and the connection module 15. When the first switching module 11 is in the turn-off state, the first switching module 11 disconnects the first input terminal 101 from the connection module 15. The first switching module 11 includes at least one first switch Sa. The quantity of first switch Sa is relative to a phase of the first power source A. When the first power source A is a 3-phase AC source, there are three first switches Sa, or a multiple of 3. When the first power source A is a single phase AC source, the number of first switches Sa is only one, or a multiple of one. In one embodiment, the first switching module 11 includes six first switches, Sa1-Sa6. Each first switch Sa is a relay.

When the second switching module 13 is in the turn-on state, the second switching module 13 establishes a connection between the second input terminal 103 and the connection module 15. When the second switching module 13 is in the turn-off state, the second switching module 13 disconnects the second input terminal 103 from the connection module 15. The second switching module 13 includes at least one second switch Sb. The quantity of second switch Sb is relative to a phase of the second power source B. When the second power source B is a 3-phase alternating power source, there are three second switches Sb, or a multiple of 3. When the second power source B is a single phase alternating power source, the number of second switches Sb is only one, or a multiple of one. Each second switch Sb is a relay.

The connection module 15 outputs the AC from one of the first switching module 11 and the second switching module 13, from first power source A or second power source B, to the PSUs 20. In one embodiment, the connection module 15 is a connector with six output pins. The connection module 15 includes first, second, and third input pins, IN1-IN3, first, second, and third function pins, INF4-INF6, and at least one output port O1.

Three live wires A1-A3 of the first power source A respectively connect with the input pins IN1, IN2, and IN3 through the first switching module 11. Three neutral lines of the first power source A respectively connect with function pins INF4, INF5, and INF6, also through the first switching module 11.

Through the second switching module 13, three live wires B1-B3 of the second power source B connect, respectively, to input pins IN1, IN2, and IN3. Again through the second switching module 13, three neutral lines of the second power source B respectively connect with function pins INF4, INF5, and INF6.

The output port O1 is electrically connected to the PSU 20. In other embodiments, the function pins IN4-IN6 are capable of connection with the live wires of the first power source A or the live wires of the second power source B.

The PSU 20 receives the AC from the PDU 10. The PSU 20 includes an AC/DC conversion module 21, a battery module 23, and a load module 25.

The AC/DC conversion module 21 converts the AC into direct voltage (DC) and outputs the DC to the load module 25 for driving the load module 25 to work. In one embodiment, the AC/DC conversion module 21 can further include a filter module (not shown), and other function modules.

The battery module 23 is configured to supply the DC to the load module 25 when there is no DC generated by the AC/DC conversion module 23. In one embodiment, the battery module 23 can be an accumulator, a solar cell, or a dry cell, but not being limited thereto.

The loading module 25 includes at least one server.

When the first power source A and the second power source B are both 220V 3-phase AC, the relationship between the number of the PDUs 10 and the number of the PSUs 20 is as follows.

When the specified power of the PSU 20 is 1050 watts (1050 W), an operation current of the PSU 20 is 1.6 A, which is calculated by the power rating 1050 divided by 3 and 220. Due to the maximum current outputted by the PDU 10 being 20 A, the maximum number of the PSUs 20 that can be connected to one PDU 10 is 12.5, which is obtained by the maximum current of the PDU 10 divided by the specified current of the PSU 20. For stability, based on the specified power of the PSU 20, the maximum number of the PSUs 20 connected with the PDU 10 is 12.

As described above, in the server system 1 with the 3-phase first power source A and the 3-phase second power source B, the first switching module 11 and the second switching module 13 are embedded in each PDU 10, in which each PDU 10 is supporting six PSUs 20. To support 48 PSUs 20, eight PDUs 10 are needed, and the number of the switches in the PDU 10 is 96. 96 is obtained by the number of the PDUs 10 multiplied by the number of the first switches Sa and the second switches Sb in one PDU 10. In a related art, the number of the switches embedded in the PSU 10 is 288, which is obtained by the number of the PSUs 20 multiplied by the number of the switches in one PSU 20. Therefore, as the result, the number of switches in the server system 1 is reduced, and the size of the PSU 20 is therefore reduced.

While various and preferred embodiments have been described the disclosure are not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A power distribution unit (PDU) connected with a plurality of power supply units (PSUs), the PDU with a first input terminal and a second terminal; the first input terminal receiving an alternating current (AC) from a first power source, and the second input terminal receiving an AC from a second power source; the PDU comprising:
 a connection module connected with the plurality of PSUs;
 a first switching module connected between the first input terminal and the connection module, and configured to switch between a turn-on state and a turn-off state;
 a second switching module connected between the second input terminal and the connection module, and configured to switch between a turn-on state and a turn-off state;
 a processor configured to control such that wherein in the turn-on state, the first switching module establishes a connection between the first input terminal and the connection module, in the turn-off state, the first switching module disconnects the first input terminal with the connection module; in the turn-on state, the second switching module establishes a connection between the second input terminal and the connection module, in the turn-off state, the second switching module disconnects the second input terminal with the connection module; in any point in time, the first switching module and the second switching module are in opposite states;

wherein the connection module comprises a first input pin, a second input pin, a third input pin, at least one function pin, and at least one output port; three live lines of the first power source are electrically connected to the first input pin, the second input pin, the third input pin through the first switching module; three live lines of the second power source are electrically connected to the first input pin, the second input pin, the third input pin through the second switching module; neutral lines of the first power source and the second power source are electrically connected to the at least one function pin; the at least one output port is electrically connected to the PSU.

2. The PDU of claim 1, wherein when the first input terminal receives the AC from the first power source and the second input terminal receives the AC from the second power source, the first switching module is in the turn-on state, and the second switching module is in the turn-off state, the connection module outputs the AC from the first switching module generated by the first power source to the connected PSU.

3. The PDU of claim 2, wherein the first switching module and the second switching module are automatic transfer switching elements; when the AC of the first power source fluctuates, the first switching module automatically switches to the turn-off state, and the second switching module automatically switches to the turn-on state, the connection module outputs the AC from the second switching module generated by the second power source power source to the connected PSUs.

4. The PDU of claim 1, wherein a number of the PSUs connected to one PDU is calculated by a power of the PSU and a working current of each PSU.

5. A server system comprising:
a plurality of power supply units (PSUs); and
a plurality of power distribution units (PDUs) connected with the PSUs, each PDU with a first input terminal and a second input terminal; the first input terminal receiving an alternating voltage (AC) from a first power source, the second input terminal receiving an AC from a second power source; each PDU comprising:
 a connection module connected with the plurality of PSUs;
 a first switching module connected between the first input terminal and the connection module, and configured to switch between a turn-on state and a turn-off state;
 a second switching module connected between the second input terminal and the connection module, and configured to switch between a turn-on state and a turn-off state;
 a processor configured to control such that wherein in the turn-on state, the first switching module establishes a connection between the first input terminal and the connection module, in the turn-off state, the first switching module disconnects the first input terminal with the connection module; in the turn-on state, the second switching module establishes a connection between the second input terminal and the connection module, in the turn-off state, the second switching module disconnects the second input terminal with the connection module; in any point in time, the states of the first switching module and the second switching module are in opposite states;

wherein the connection module comprises a first input pin, a second input pin, a third input pin, at least one function pin, and at least one output port; three live lines of the first power source are electrically connected to the first input pin, the second input pin, the third input pin through the first switching module; three live lines of the second power source are electrically connected to the first input pin, the second input pin, the third input pin through the second switching module; neutral lines of the first power source and the second power source are electrically connected to the at least one function pin; the at least one output port is electrically connected to the PSU.

6. The server system of claim 5, wherein the first switching module and the second switching module are automatic transfer switching elements; when the first input terminal receives the AC from the first power source and the second input terminal receives the AC from the second power source, the first switching module automatically switches to the turn-on state, and the second switching module automatically switches to the turn-off state, the connection module outputs the AC from the first switching module generated by the first power source to the connected PSU.

7. The server system of claim 6, wherein when the AC of the first power source fluctuates, the first switching module automatically switches to the turn-off state, and the second switching module automatically switches to the turn-on state, the connection module outputs the AC from the second switching module generated by the second power source power source to the connected PSUs.

8. The server system of claim 5, wherein a number of the PSUs connected to one PDU is calculated by a power of the PSU and a working current of each PSU.

* * * * *